United States Patent
Messerschmidt

(10) Patent No.: US 9,074,862 B2
(45) Date of Patent: Jul. 7, 2015

(54) CORRECTIVE FIBER-OPTIC MICROPROBE FOR WHITE LIGHT INTERFEROMETRIC MEASUREMENTS

(71) Applicant: GRINTECH GmbH, Jena (DE)

(72) Inventor: Bernhard Messerschmidt, Jena (DE)

(73) Assignee: GRINTECH GmbH, Jena (DE)

( * ) Notice: Subject to any disclaimer, the term of this patent is extended or adjusted under 35 U.S.C. 154(b) by 182 days.

(21) Appl. No.: 13/692,025

(22) Filed: Dec. 3, 2012

(65) Prior Publication Data

US 2013/0188195 A1 Jul. 25, 2013

(30) Foreign Application Priority Data

Dec. 2, 2011 (DE) .......... 10 2011 056 002

(51) Int. Cl.
*G01B 9/02* (2006.01)
*G02B 27/10* (2006.01)
(Continued)

(52) U.S. Cl.
CPC .......... *G01B 9/02049* (2013.01); *G02B 27/005* (2013.01); *G01B 9/02007* (2013.01);
(Continued)

(58) Field of Classification Search
CPC ............. G01B 9/02049; G01B 9/0205; G01B 9/02055; G01B 9/02056; G01B 9/02057; G01B 9/02058; G01B 9/020007; G01B 9/0209; G01B 9/02091; G01B 9/02007; G02B 27/005; G02B 27/1006; G02B 27/141; G02B 3/0087; G02B 6/26; G02B 6/262; G02B 6/29364
USPC ............... 356/479, 497, 480; 385/15
See application file for complete search history.

(56) References Cited

U.S. PATENT DOCUMENTS 6,487,342 B1 11/2002 Wu et al.
6,659,614 B2 * 12/2003 Katayama et al. ............ 359/846
(Continued)

FOREIGN PATENT DOCUMENTS

DE 267311 A1 4/1989
DE 102006048316 A1 4/2008
(Continued)

OTHER PUBLICATIONS

Depiereux, F., et al., "Fiber-optical sensor with miniaturized probe head and nanometer accuracy based on spatially modulated low-coherence interferogram analysis," Applied Optics, Jun. 10, 2007, pp. 3425-3431, vol. 46, No. 17.

*Primary Examiner* — Michael A Lyons
*Assistant Examiner* — Violeta A Prieto
(74) *Attorney, Agent, or Firm* — Patentbar International, P.C.

(57) ABSTRACT

An optically corrective microprobe for white light interferometry is disclosed. In white light interferometry which uses different spectral ranges, the dispersion-induced dependency of optical path differences on the wavelength between measurement light bundle and reference light bundle is compensated by an efficient, easily miniaturized arrangement. A reference beamsplitter with partially reflecting filters in at least two different spectral ranges for generating at least two transmitted measurement light bundles and associated reflected reference light bundles of nonoverlapping spectral ranges is arranged between the light output surface of the light-conducting fiber and the focusing optics. An axial distance between two partially reflecting filters is adjusted in such a way that a spectrally induced optical path difference to which the respective measurement light bundles are subjected when passing through dispersive elements in the light path to the object surface and back is present to the same magnitude between the respective reference light bundles.

16 Claims, 5 Drawing Sheets

(51) Int. Cl.
  *G02B 27/14* (2006.01)
  *G02B 6/26* (2006.01)
  *G02B 27/00* (2006.01)
  *G02B 3/00* (2006.01)
  *G02B 6/293* (2006.01)

(52) U.S. Cl.
  CPC .......... *G01B 9/02057* (2013.01); *G01B 9/0205* (2013.01); *G01B 9/0209* (2013.01); *G01B 9/02091* (2013.01); *G02B 3/0087* (2013.01); *G02B 27/1006* (2013.01); *G02B 27/141* (2013.01); *G01B 9/02058* (2013.01); *G02B 6/26* (2013.01); *G02B 6/262* (2013.01); *G02B 6/29364* (2013.01)

(56) References Cited

U.S. PATENT DOCUMENTS

| | | | |
|---|---|---|---|
| 6,842,549 B2 * | 1/2005 | So | 385/15 |
| 6,844,875 B2 | 1/2005 | Seals et al. | |
| 7,221,827 B2 | 5/2007 | Domash et al. | |
| 7,369,225 B2 * | 5/2008 | Messerschmidt et al. | 356/241.1 |
| 7,511,891 B2 * | 3/2009 | Messerschmidt | 359/654 |
| 7,561,273 B2 * | 7/2009 | Stautmeister et al. | 356/445 |
| 8,077,323 B2 | 12/2011 | Drabarek et al. | |
| 8,400,641 B2 * | 3/2013 | Furukawa et al. | 356/511 |
| 8,773,666 B2 * | 7/2014 | Karrai et al. | 356/506 |
| 2002/0102052 A1 * | 8/2002 | Thompson et al. | 385/27 |
| 2002/0176659 A1 | 11/2002 | Lei et al. | |
| 2005/0174664 A1 | 8/2005 | Ito et al. | |
| 2011/0007323 A1 | 1/2011 | De Groot et al. | |

FOREIGN PATENT DOCUMENTS

| | | |
|---|---|---|
| DE | 102007039556 B3 | 1/2009 |
| DE | 102010022421 A1 | 12/2011 |
| WO | 02082008 A1 | 10/2002 |
| WO | 2009024344 A1 | 2/2009 |
| WO | 2011151255 A1 | 12/2011 |

* cited by examiner

CORRECTIVE FIBER-OPTIC MICROPROBE FOR WHITE LIGHT INTERFEROMETRIC MEASUREMENTS

RELATED APPLICATIONS

This application claims priority to German Patent Application No. 10 2011 056 002.5, filed Dec. 2, 2011, which is incorporated herein by reference in its entirety.

FIELD OF THE INVENTION

The invention is directed to an optically corrective microprobe for white light interferometry, a method for producing the dispersion-correcting reference beamsplitter used for this purpose, and an arrangement for white light interferometry outfitted therewith.

BACKGROUND OF THE INVENTION

A large number of different evaluation methods exists in the field of optical metrology. Many of these employ interferometry with incoherent light or short coherence light in the visible and near infrared range. Because of the spectrum of light, the resolution of interferometric measurement methods is better than 1 μm in principle. As a result, these methods are particularly suitable for highly precise measurement of lengths, for example, in vibration analysis or surface inspection of workpieces. Specifically, interferometry with short coherence light or white light is an established technique, for example, for measuring roughness or for measuring microstructures on precision manufactured parts.

A majority of the measuring systems based on this technique, however, involve large, relatively inflexible devices which are intended exclusively for carrying out a measurement task. In order to measure small voids as well, it is necessary to use small or even miniaturized measurement probes. In this case, optical microprobes of this kind make up a component part of an optical sensor system and can be applied to the object surface, where they detect changes in distance between the microprobe and the object surface with great precision.

Because short coherence light is used in such systems are very high. So as not to lose the ability of the light to interfere, no dispersion differences may occur between measurement light bundles and reference light bundles. Moreover, in order to achieve a high spatial resolution and, at the same time, insensitivity to locally oblique surfaces in the object surface to be measured, it is advantageous when the measurement light bundle exits the measurement probe with the highest possible numerical aperture and therefore impinges on the object surface in a sharply focused manner.

Optical microprobe technology is a field whose potential has barely been tapped in industrial manufacturing. The reason for this consists primarily in the lack of availability of suitable, inexpensive sensor systems which are able to meet requirements with respect to miniaturization, accuracy, robustness and measuring speed.

A simple and flexible variant is described in the publication APPLIED OPTICS, Vol. 46, No. 17. The description relates to the combination of a Michelson interferometer used as receiver and a fiber-coupled microprobe which is itself made up of fiber-optic components and acts as a Fizeau interferometer. The Fizeau interferometer causes the light which is used for interferometry to be split into a measurement light bundle and a reference light bundle. A portion of a gradient index fiber with a maximum numerical aperture of NA =0.11 is arranged at the output of the microprobe for beam-shaping the measurement light bundle on the object surface. The desired focusing is adjusted in the microprobe by means of the length of the gradient index fiber portion. An improved signal quality is achieved here through the use of two light sources emitting in different spectral ranges allowing a more precise evaluation of the interferogram. However, a disadvantage in this solution is the virtually collimated parallel measurement light bundle which renders the microprobe undesirably sensitive to inclinations and irregularities on the object surface because the measurement signal fed back into the light-conducting fiber is severely weakened by a possible incline on the object surface. However, the in-probe reference light bundle of the Fizeau probe which is generated at the light output surface of the gradient index fiber portion is not subject to any dispersion effects with respect to the actual measurement signal.

German Patent 10 2007 039 556 B3 likewise describes a fiber-optic microprobe in which a distance from the object surface can be kept as short as possible at higher numerical apertures (NA≥0.1) by means of optical components which are individually adapted to the measurement task. To prevent the beam traveling freely between the microprobe and object surface from undergoing any further refraction and, therefore, a further increase in the chromatic aberration, the end of the microprobe is additionally constructed as a concave surface whose focus lies in the light-conducting fiber core and in the measurement spot. The concave surface serves to generate the reference light bundle. Since there is no dispersive medium between the measurement spot and the concave surface, no wavelength-dependent path differences result in this case between the measurement light bundle and reference light bundle. However, the individually adapted optical elements and the very small concave end which is exactly adapted to the focal length of the microprobe require a high expenditure for production of the microprobe. Another drawback of concave reference surfaces near the actual measurement spot, aside from the reduced divergence of the measurement light bundle, is that the concave surface must be positioned with micron to submicron accuracy with respect to the light emergence point of the single-mode (monomode) fiber of the microprobe because the reference light bundle reflected at the concave surface can only be efficiently fed back into the light-conducting fiber when there is a very good overlap of the virtual focus of the concave surface with the light-conducting fiber core, whose size is typically between 2 μm and 5 μm. This requirement significantly complicates the mounting and alignment of all of the components relative to one another and assumes a long-term mechanical and climatic stability of the overall system that is difficult to achieve. Therefore, it is hardly possible to miniaturize the microprobe while retaining robustness at the same time.

SUMMARY OF THE INVENTION

It is crucial for a highly accurate, high-quality measurement, particularly in white light interferometry, that the measurement spot is generated as far as possible without aberrations and that wavelength-dependent optical path differences between the measurement light bundle and reference light bundle are minimized Therefore, it is the object of the invention to find a novel possibility for white light interferometry which uses an expanded spectral range to allow the dispersion-induced dependency of optical path differences on the wavelength between measurement light bundle and reference light bundle to be compensated by an efficient and easily miniaturized arrangement even when optical elements whose dispersive materials bring about a wavelength dependency of the optical path differences are located between the optical surface which couples the reference light bundle out of the measurement light bundle and the measurement spot. An expanded object consists in that the solution can also be used to measure oblique and/or reflective object surfaces.

In an optical microprobe for focusing a light bundle on an object surface for interferometric measurements in which the light bundle has white light with at least two different spectral ranges and the microprobe comprises a light-conducting fiber transmitting the light bundle, focusing optics for focusing the light bundle on an object surface, and a light path adjoining the light output surface of the light-conducting fiber for generating a divergent light bundle for exploiting the aperture of the focusing optics, wherein a measurement light bundle is reflected from the light output surface of the focusing optics to the object surface and from the object surface back through the microprobe into the light-conducting fiber and a reference light bundle generated by partial reflection at the light output surface of the light-conducting fiber is reflected back into the light-conducting fiber, the above-stated object is met according to the invention in that a reference beamsplitter having filters which are partially reflecting in at least two different spectral ranges for generating at least two transmitted measurement light bundles and associated reflected reference light bundles of nonoverlapping spectral ranges is arranged between the light output surface of the light-conducting fiber and the focusing optics, wherein an axial distance between two partially reflecting filters is adjusted in such a way that a spectrally induced optical path difference to which the respective measurement light bundles are subjected when passing through dispersive elements in the light path to the object surface and back is present in the same magnitude between the respective reference light bundles, so that the dispersion-induced optical path difference between the measurement light bundles and associated reference light bundles is compensated, and that the chromatic aberration of the focusing optics is so slight that the foci of the spectrally different measurement light bundles at least partially overlap at least in a desired measurement range for the object surface.

The reference beamsplitter advantageously has a layer construction comprising at least two partially reflecting interference filters adapted to the spectral ranges of the spectrally separated measurement light bundle and reference light bundle and, in each instance, a transparent spacer layer which axially separates the partially reflecting interference filters, wherein the dispersion-compensating effect with respect to the measurement light bundles can be adjusted by adapting the layer thickness and refractive index of the spacer layer.

The partially reflecting filters are preferably formed as interference filters with a sharp cut-off filter characteristic for generating measurement light bundles and reference light bundles with no spectral overlapping. In an alternative embodiment, they can also be formed as special color filters for generating spectrally separated measurement light bundles and reference light bundles, wherein, owing to a reduced steepness of the cut-off filter characteristic of the color filters, the light source has spectrally separated spectral ranges for generating measurement light bundles and reference light bundles with no spectral overlapping.

In a general variant, the reference beamsplitter has a plurality of partially reflecting filters in a system of filter layers passing into one another, wherein layers of the filter layer system are so selected with respect to thickness and refractive index that separate spacer layers are omitted and a quasi-continuous dispersion compensation can accordingly be achieved.

The reference beamsplitter is advisably arranged on a surface of a transparent support material, which surface is arranged opposite the light output surface of the light-conducting fiber. However, it can also be arranged directly on the light output surface of the light-conducting fiber. In so doing, it is preferably vapor-deposited on the light output surface of the light-conducting fiber as layer system.

In an alternative constructional form, the reference beamsplitter can be glued directly to the light output surface of the light-conducting fiber, wherein a support material used as a production aid can either remain on the layer construction or can be removed.

The focusing optics advantageously comprise conventional refractive optics and diffractive optics for correcting the chromatic aberration. In a preferred variant, the focusing optics comprise a GRIN lens which is combined with diffractive optics for correcting the chromatic aberration.

It is particularly advantageous when the focusing optics comprise a GRIN lens and additional refractive optics for increasing the object-side numerical aperture and are combined with diffractive optics for correcting the chromatic aberration. In so doing, the refractive optics are advisably a plano-convex lens formed as front lens of the focusing optics opposite the object surface so that the focusing optics have an object-side numerical aperture of NA>0.55 which is increased over the nominal numerical aperture of the GRIN lens.

The diffractive optics for correcting the chromatic aberration are advisably arranged as layer system on an optical surface of the focusing optics.

In an alternative embodiment, the focusing optics can be formed as an achromat or particularly as an apochromat for correcting the chromatic aberration.

In an arrangement for white light interferometry having an interferometer, a microprobe for measuring an object surface, a light source with a white light spectrum or with at least two different spectral ranges, a light-conducting fiber for transporting the light source light into the microprobe and for transmitting the light reflected back from the microprobe and object surface into the interferometer, a light coupler for producing an optical connection between light source and light-conducting fiber, and focusing optics located in the microprobe, wherein a light path is provided in the microprobe between a light output surface of the light-conducting fiber and the focusing optics for generating a divergent light bundle for exploiting the aperture of the focusing optics to generate at least two spectrally different measurement light bundles, which light path has a size that is adapted to the numerical aperture of the light-conducting fiber and the aperture of the focusing optics, and a reference beamsplitter for generating at least two spectrally different reference light bundles, the object of the invention is further met in that the reference beamsplitter comprises at least two spectrally differently partially reflecting filters for generating two transmitted measurement light bundles and associated reflected reference light bundles of spectral ranges which do not overlap, wherein the partially reflecting filters have an axial distance with respect to one another such that a spectrally induced optical path difference resulting for center wavelengths $\lambda_1, \lambda_2, \ldots$ of the different spectral ranges of the measurement light bundles when passing through dispersive optics in the light path to the object surface and back is adjusted to the same magnitude between the associated reference light bundles so that when the measurement light bundle and reference light bundle are superposed the dispersion-induced path difference is compensated, and the chromatic aberration of the focusing optics is so slight for the different spectral ranges that are used that the foci of the spectrally different measurement light bundles at least partially overlap at least in a desired measurement range for the object surface.

A further object of the invention is the use of a microprobe according to the invention for coherence tomography in which, as a result of the compensation of the dispersion-induced path difference and the correction of the chromatic aberration in coherence tomography, an absolute interferometric path length measurement is achieved in nanometer range also for sharply inclined measurement surfaces at base distances between the microprobe and measurement object of several hundreds of micrometers.

Further, the above-stated object is met in a method for producing a dispersion-compensating reference beamsplitter for at least two spectral ranges of a light bundle by the following steps:

a) a first alternating layer system forming an interference filter of the shorter-wavelength spectral component of the light bundle is arranged on a transparent support material with precision-optical surface quality;

b) a transparent spacer layer having a layer thickness depending on the optical path difference of two spectrally adjacent measurement light bundles is arranged inside focusing optics;

c) a second alternating layer system forming an interference filter of the longer-wavelength spectral component of the light bundle is arranged on the spacer layer;

d) the support material is singulated into individual reference beamsplitters.

The invention makes it possible to provide a solution for white light interferometry which uses an expanded spectral range to allow the dispersion-induced dependency of path length differences on the wavelength between measurement light bundle and reference light bundle to be compensated by an efficient and easily miniaturized arrangement when optical elements, e.g., lenses, whose dispersive materials bring about a wavelength dependency of the optical path difference are located between the optical surface which couples out the reference light bundle and the measurement spot of the measurement light bundle. By generating the reference signal directly at the light output of the light-conducting fiber, the microprobe can be designed very simply and constructed so as to be mechanically stable over the long term and easy to miniaturize because complex mechanics are dispensed with. Further, it is no longer necessary to compensate for the dispersion in the interferometer in a probe-specific manner. Further, the invention is also suitable for interferometric measurements, particularly on oblique and/or reflective object surfaces using focusing optics with a higher numerical aperture (e.g., NA>0.55).

BRIEF DESCRIPTION OF THE DRAWINGS

The invention will be described more fully in the following with reference to embodiment examples. The accompanying drawings show.

DETAILED DESCRIPTION OF THE PREFERRED EMBODIMENTS

Figure 1:
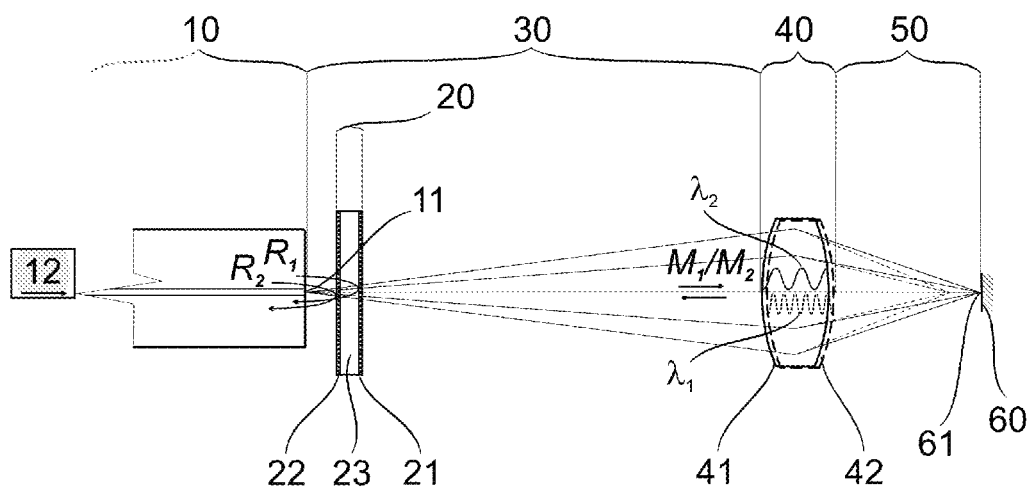
FIG. 1 is a schematic view of the basic optical design of the microprobe.

According to the optical construction shown in FIG. 1, the illustrated microprobe (shown more detailed as 80 in FIG. 5) includes a light-conducting fiber 10 for coupling in light. A reference beamsplitter 20 is arranged opposite a light output surface 11 of the light-conducting fiber 10. This reference beamsplitter 20 has at least two partially reflecting filters for coupling reference light bundles $R_1$ and $R_2$ out of at least two spectrally different measurement light bundles $M_1$ and $M_2$. The reference beamsplitter in FIG. 1 further has at least one partially reflecting interference filter 21 for a shorter-wavelength light spectrum around a center wavelength $\lambda_1$ and a partially reflecting interference filter 22 for a longer-wavelength light spectrum around a center wavelength $\lambda_2$. A spacer layer 23 which will be described more precisely in the following is arranged between the interference filters 21 and 22. Instead of the interference filters 21 and 22, other partially reflecting spectral cut-off filters can also be used provided the reference light bundles $R_1$ and $R_2$ and measurement light bundles $M_1$ and $M_2$ resulting therefrom are sufficiently spectrally separated.

Focusing optics 40 are arranged in the beam path downstream of the light-conducting fiber 10 and reference beamsplitter 20. A light path 30 with optically thin medium (e.g., air) is provided between the light output surface 11 and the focusing optics 40. The optical construction of the microprobe 80 is terminated by the focusing optics 40 in front of which is arranged an object surface 60 (as measurement object) at a measuring distance 50.

A light-conducting fiber 10 in the form of a single-mode fiber is used for guiding broadband light 12 as white light spectrum or at least two spectral light components with a limited bandwidth from which the desired separated measurement light bundles and reference light bundles $M_1$, $R_1$ and $M_2$, $R_2$, respectively, are generated and for coupling the latter into the microprobe 80 shown in FIG. 1. Since only the basic mode of the coupled in radiation can propagate in the single-mode fiber, defined phase relations are maintained for the center wavelengths $\lambda_1$ and $\lambda_2$ in the measurement light bundles $M_1$ and $M_2$ used for interferometric measurement.

Corresponding to the spectral configuration of the interference filters 21 and 22, the light 12 used for interference measurement is filtered and divided through the reference beamsplitter 20. The measurement light bundle $M_1$ and the reference light bundle $R_1$ have light in a short-wavelength spectral range corresponding to center wavelength $\lambda_1$. In an analogous manner, a measurement light bundle $M_2$ and an associated reference light bundle $R_2$ which both have light in a same long-wavelength spectral range with the center wavelength $\lambda_2$ are generated, respectively, at interference filter 22. The reference light bundles $R_1$ and $R_2$, respectively, are reflected back at the corresponding interference filters 21 and 22, respectively, into the light-conducting fiber 10 by partial reflection; the reflected portions only amount to a few percent, preferably 2 and 10%, of the intensity of the filtered spectral band. The measurement light bundles $M_1$ and $M_2$, respectively, are transmitted through the reference beamsplitter 20 and diverge with the numerical aperture of the light-conducting fiber 10 into the light path 30.

The measurement light bundles $M_1$ and $M_2$ are focused by the focusing optics 40 to a common measurement spot 61 on the object surface 60 and a portion of the measurement light bundles $M_1$ and $M_2$, respectively, is reflected back or backscattered from the object surface 60 into the light-conducting fiber 10. The spectral position and width of the measurement light bundles $M_1$ and $M_2$ which are generated with a sharp edge steepness of the spectral ranges and also the quantity thereof are determined by the specific construction of the interference filters 21 and 22. The measurement light bundles $M_1$ and $M_2$ are preferably made only narrowband. The quantity of interference filters 21, 22, . . . can be adapted to the requirements of the interferometric evaluation method.

It is also possible to realize the reference beamsplitter 20 by means of special color filters. Because of the reduced edge steepness of the color filters, a light source is used for this purpose which can already provide spectrally separated spectral ranges to enable the spectral separation of measurement light bundle $M_1$ and reference light bundle $R_1$ from measurement light bundle $M_2$ and reference light bundle $R_2$.

In the basic construction shown in Fig, 1, the reference beamsplitter 20 used has a layer construction of two interference filters 21 and 22, respectively, which are adapted to the spectral ranges of the spectrally separated measurement light bundles and reference light bundles $M_1$ and $R_1$, respectively, and $M_2$ and $R_2$, respectively. The interference filter 21 arranged at a greater distance from the light output surface 11 of the light-conducting fiber 10 reflects a portion of the shorter-wavelength light exiting from the light-conducting fiber 10 in a limited spectral range around the center wavelength $\lambda_1$ as reference light bundle $R_1$ back into the light-conducting fiber 10 and passes measurement light bundle $M_1$. The interference filter 22 arranged near the light output surface 11 reflects a portion of the longer-wavelength light leaving the light-conducting fiber 10 in a limited spectral range around the center wavelength $\lambda_2$ as reference light bundle $R_2$ back into the light-conducting fiber 10 and passes measurement light bundle $M_2$.

The spacer layer 23 which is transparent to the two different spectral ranges is arranged between the partially reflecting interference filters 21 and 22. This spacer layer 23 has a thickness which—taking into account the refractive index of the material of the spacer layer 23—is exactly adapted to the optical path difference of the measurement light bundles $M_1$ and $M_2$ caused by dispersion, which optical path difference occurs due to dispersive materials (optically denser media such as, e.g., focusing optics 40) en route from exiting the light output surface 11 via reflection at the object surface 60 to re-entry into the light-conducting fiber 10.

The reference beamsplitter 20 is arranged in the light path 30 downstream of the light output surface 11 of the light-conducting fiber 10. The layer construction can be produced by common methods for coating optical surfaces.

The light path 30 between the light output surface 11 and the focusing optics is provided for expanding the measurement light bundles $M_1$ and $M_2$ after leaving the light-conducting fiber 10. The length of the light path 30 is adapted to the exit aperture of the light-conducting fiber 10 and to the entrance aperture of the downstream focusing optics 40 so that the divergent measurement light bundles $M_1$ and $M_2$, respectively, can make maximum use of the free aperture of the focusing optics 40. The light path 30 can be any medium with the lowest possible refractive index; gaseous media, preferably air, can be used in particular. However, a medium whose dispersion is equal to or as close as possible to zero is advantageous so that the wavelength dependency of the optical path differences is not increased unnecessarily.

The measurement light bundles $M_1$ and $M_2$ are focused through the focusing optics 40 on a measurement spot 61 located on the object surface 60. Owing to the different spectral ranges around a center wavelength $\lambda_1$ in measurement light bundle $M_1$ and around a center wavelength $\lambda_2$ in measurement light bundle $M_2$, a wavelength-dependent dispersion takes place when passing through the focusing optics 40. The dispersion gives rise to two distinct effects:

1. a chromatic aberration (chromatic focal shift) that can be described by the law of refraction, and 2. an optical path difference (OPD) which is undesirable for interference measurements and which is given by the product of a geometric light path s and a wavelength-independent refractive index: $OPD(\lambda)=s*n(\lambda)$.

As a result of the latter OPD based on wavelength-dependent refractive indices of the focusing optics 40, phase differences occur between reference light bundles and measurement light bundles $R_1$, $M_1$ and $R_2$, $M_2$, respectively, which phase differences arise independent of a change in distance between the object surface 60 and focusing optics 40 that is to be determined by the interference measurement and which accordingly cause a corruption of the measurement results. The wavelength-dependent effect on the measurement light bundles $M_1$ and $M_2$, respectively, is illustrated in FIG. 1 by the focusing optics 40 represented by different types of lines, wherein the effective refractive index for the longer-wavelength measurement light bundle $M_2$ is symbolized by (imaginary) focusing optics 41 shown in solid lines and the effective refractive index for the shorter-wavelength measurement light bundle $M_1$ is symbolized by (imaginary) focusing optics 42 shown in dashed lines.

Further, as is indicated above under item 1, a longitudinal chromatic aberration results in the measurement spot 61 between the measurement light bundles $M_1$ and $M_2$. As a result of this wavelength dependency, there would also be a chromatic focal shift between measurement light bundles $M_1$ and $M_2$ which should likewise be prevented according to the invention.

Therefore, two different chromatic corrections are carried out in the optical construction shown in FIG. 1: one to compensate for the optical path differences between reference light bundles and measurement light bundles $R_1$, $M_1$ and $R_2$, $M_2$, respectively, and one to correct the longitudinal chromatic aberration between measurement light bundles $M_1$ and $M_2$.

The longitudinal chromatic aberration can be corrected by means of different approaches: conventionally, by means of a so-called achromat, i.e., in this case, a collective lens and a dispersive lens made from glasses with different dispersions are combined so that the focus for two different wavelengths (wavelength ranges) is superposed. A plurality of wavelengths can also be chromatically corrected through the use of more complex combinations. An apochromat can advantageously be used for this purpose.

As an alternative to achromats and apochromats, a combination of a refractive collective lens and a diffractive collective lens can also lead to a good correction of the chromatic aberration. Compared to collective lenses made from glasses with normal dispersion, diffractive lenses, also as collective lens, have an opposite, very strong dependency of focal length on wavelength.

The approaches described above for correcting longitudinal aberration do not however compensate for so-called phase dispersion, i.e., optical path differences resulting from a wavelength-dependent change in the refractive index. The spectral dependency of the optical path lengths is compensated, according to the invention, by the special reference beamsplitter 20 so that the associated measurement light bundles and reference light bundles $M_1$, $R_1$ and $M_2$, $R_2$ do not have phase differences resulting from the wavelength dependency of the refractive index for the different spectral ranges.

In view of the fact that the phase dispersion of the measurement light bundles $M_1$ and $M_2$, respectively, has a negative impact on measuring accuracy and on the resolution of the interferometric measurement, a spectrally induced optical path difference between the measurement light bundles $M_1$ and $M_2$ must be prevented or compensated. Therefore, interference filters 21 and 22 which are spaced apart in a defined manner by a spacer layer 23 are used to compensate for this. By adapting the thickness of the spacer layer 23 traversed by measurement light bundles $M_1$ and $M_2$ and only by reference light bundle $R_1$ (twice), the difference in dispersion between the respective associated reference light bundles $R_1$ and $R_2$ can be adjusted to the same magnitude in such a way, depending on the optical path difference between the spectrally different measurement light bundles $M_1$ and $M_2$ which occurs when passing (twice) through the focusing optics 40, that this dispersion difference corresponds to the optical path difference between the measurement light bundles $M_1$ and $M_2$. In this way, the optical path difference resulting in an unwanted manner for the interferometric measurement as a result of phase dispersion in the measurement light bundles $M_1$ and $M_2$ is compensated. Further, the effect of the spacer layer 23 is dependent on the refractive index of the material used for producing it and must be taken into account in adjusting the thickness. A material with a refractive index matching the dispersive elements of the focusing optics 40 (e.g., BK7) is preferably used.

Figure 2A:
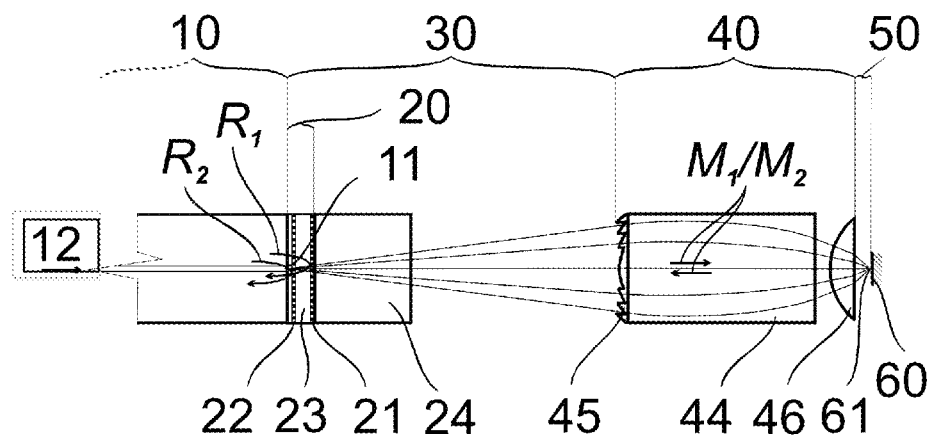
FIG. 2a is a schematic illustration of a preferred embodiment of the optical design of a microprobe with aberration correction comprising diffractive optics and refractive GRIN and plano-convex lenses.

An advantageous dispersion-compensating and aberration-correcting construction of the microprobe 80 is shown in FIG. 2a. The construction of the reference beamsplitter 20 in this case is modified from that in FIG. 1. When producing the reference beamsplitter 20 by a method which will be described more exactly in the following, the layer construction comprising interference filter 21, spacer layer 23 and interference filter 22 is arranged on a separate, transparent support material 24 which is connected to the light output surface 11 of the light-conducting fiber 10 on the layer construction side. The optical connection of the reference beamsplitter 20 to the light-conducting fiber 10 can be carried out by means of an optical cement or glue between the interference filter 22 and light output surface 11. The thickness of the support material 24 is substantially irrelevant to the functioning of the microprobe 80 but affects the length of the remaining light path 30. Provided the support material 24 still has the necessary mechanical stability, it can be kept very thin on the one hand or can be used to completely fill the downstream light path 30 up to the focusing optics 40 on the other hand. However, the dispersion which changes with the thickness of the substrate material 24 must be taken into account in the construction of the spacer layer 23.

It is also possible to free the reference beamsplitter 20 from the support material 24 after arranging it at the light output surface 11. For example, a transfer foil on which the layer construction of the reference beamsplitter 20 is initially produced is used as support material 24 for this purpose. After connecting the light output surface 11 to the interference filter 22, the transfer foil can be separated from the reference beamsplitter 20.

It is also possible to arrange the interference filters 21 and 22 directly on the light output surface 11 of the light-conducting fiber 10 by means of a conventional coating process.

A GRIN lens 44 is used for the focusing optics 40 in FIG. 2a. The longitudinal chromatic aberration is corrected by diffractive optics 45 arranged on the side of the GRIN lens 44 facing the light path 30, and the GRIN lens 44 is used as a support for the diffractive optics 45.

The diffractive optics 45 can be arranged directly on a plane or curved surface of the focusing optics 40 by conventional coating methods or can be produced separately from the focusing optics 40 and inserted into the light path 30 in addition to the focusing optics 40.

Alternatively, instead of the GRIN lens 44 with diffractive optics 45 shown in FIG. 2a, conventional collecting optics with a diffractive coating (not shown) can also be used as focusing optics 40 for correcting the longitudinal aberration of the measurement light bundles $M_1$ and $M_2$, respectively.

The sharpness of the focusing of the measurement light bundles $M_1$ and $M_2$, respectively, on the measurement spot 61 is adjusted through the length of the GRIN lens 44. This also gives the length of a measuring distance 50 between focusing optics 40 and object surface 60 and the numerical aperture at which the measurement light bundles $M_1$ and $M_2$, respectively, exit the GRIN lens 44.

In order that the microprobe 80 can detect the highest possible proportion of the measurement light bundles $M_1$ and $M_2$, respectively, reflected back by the object surface 60 also on oblique or reflective object surfaces 60, the numerical aperture of the focusing optics 40 should be as high as possible. In order to improve the numerical aperture of NA≤0.55 that can be achieved by the GRIN lens 44, the GRIN lens 44 shown in FIG. 2a can be expanded by an additional plano-convex lens 46 to form sharper focusing optics 40. This plano-convex lens 46 arranged directly downstream of the GRIN lens 44 faces with its plane surface in direction of the object surface 60 and increases the numerical aperture up to NA≤0.85. In this way, oblique or reflecting object surfaces 60 can be sampled much more accurately and the position and changes in length thereof can be reliably measured.

When using a combination of a refractive collective lens, instead of the GRIN lens 44, and a diffractive coated collective lens (not shown), the additional plano-convex lens 46 (according to FIG. 2a) can either be substituted by virtue of the focusing characteristics of the diffractive coated collective lens or can itself be formed as a diffractive coated collective lens.

Figure 2B:
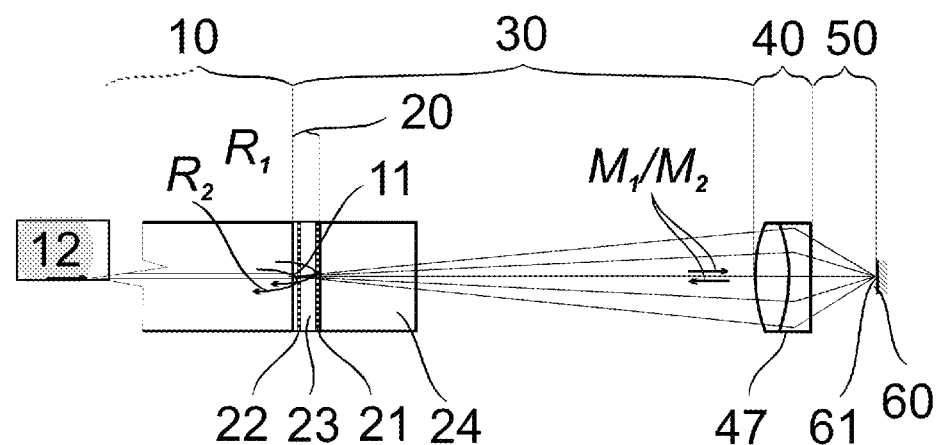
FIG. 2b is a schematic illustration of further preferred embodiment of the optical design of a microprobe with aberration correction comprising collective and dispersive refractive lenses.

Alternatively, the aberration of the focusing optics 40 for the measurement light bundles $M_1$ and $M_2$ can also be eliminated in that—as is shown in FIG. 2b—an achromat 47 having a dispersive lens and a collective lens is used and is corrected for the center wavelengths $\lambda_1$ and $\lambda_2$ of the measurement light bundles $M_1$ and $M_2$. As another alternative, an apochromat (formed by two collective lenses and a dispersive lens therebetween, not shown) which is corrected for the center wavelengths $\lambda_1$ and $\lambda_2$ and a for a mean wavelength so that it is virtually completely corrected can be used as aberration-free focusing optics 40.

Figure 3:
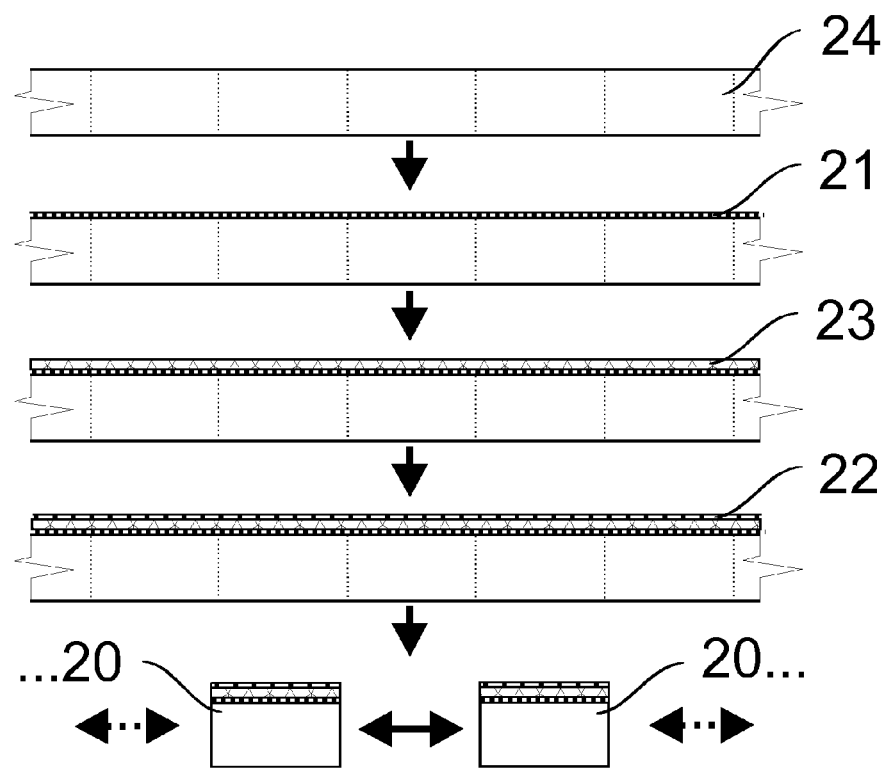
FIG. 3 is an illustration of the method steps for producing a reference beamsplitter.

A preferred possibility for the production of a dispersion-compensating reference beamsplitter 20 for at least two spectral ranges is described with reference to the method sequence illustrated in FIG. 3. The center wavelengths $\lambda_1$ and $\lambda_2$ are labeled by way of example with two specific wavelengths to identify the different spectral ranges. However, any other spectral ranges within the white light spectrum can also be used and adapted to the reference beamsplitter 20 for the center wavelengths $\lambda_1$ and $\lambda_2$ thereof.

In a first method step a), a plane-parallel optical substrate which is sufficiently transparent to the spectral ranges that are used is provided as support material 24. The quality of its surface is equivalent to precision-machined optical surfaces.

In a second method step b), a first interference filter 21 is arranged in the form of an alternating layer system which is partially reflecting by 2%<R<10% only for the shorter-wavelength spectral range and has a transmission T=1−R. Methods for optical coating of surfaces such as are known for producing interference filters are used for this purpose.

In a subsequent method step c), the transparent spacer layer 23 made of material with a refractive index similar to glass (e.g., comparable to BK7) is applied to the interference filter 21.

In a fourth method step d), a further coating is carried out on the transparent spacer layer 23 with a second interference filter 22 in the form of an alternating layer system which is partially reflecting at 2%<R<10% only for the longer-wavelength spectral range and has a transmission T=1−R.

The final method step e) consists in singulating the coated support material 24 into separate spectrally selective reference beamsplitters 20 whose dimensioning is adapted to the diameter of the measurement light bundles to be influenced.

Optionally, before step e) is carried out, method steps c) and d) can be repeated as often as necessary for a plurality of interference filters 21, 22, . . . provided with different spectral ranges in the reference beamsplitter 20. In an extreme case with a plurality of interference filters which in effect couple out a continuum of reflection wavelengths, the individual interference filters 21, 22, . . . can degenerate to an individual alternating layer system and step c) can accordingly be omitted. This results in a quasi-continuously partially reflecting beamsplitter.

A transfer foil on which the layer construction is temporarily arranged can also be used as a support material 24 provided in method step a). After method step d) or e), the layer construction can be transferred to another support, preferably the light output surface 11 of the light-conducting fiber 10, fastened by optical cement and relieved of the transfer foil.

In the present selected example, the optical substrate is initially coated with a first alternating layer system for the shorter-wavelength spectral range which forms a narrowband interference filter 21 in the form of a partially reflecting bandpass from 735 to 765 nm and has a center wavelength $\lambda_1$ of 750 nm Subsequently, the transparent spacer layer 23 is applied to the first alternating layer system and subsequently the coating of the second alternating layer system for the longer-wavelength spectral range is carried out. In the example, the second alternating layer system forms a narrowband interference filter 22 in the form of a partially reflecting bandpass in the spectral range from 815 to 845 nm with a center wavelength $\lambda_1$ of 830 nm. For the indicated spectral ranges, the interference filters 21 and 22, respectively, which are generated in this way have a reflection rate of 0.2 to 40% so that they each reflect a reference light bundle $R_1$ and $R_2$, respectively, back against the incident beam direction and transmit a measurement light bundle $M_1$ and $M_2$, respectively, with a rate of 60 to 99.8%. As a rule, the value of the reflection rate is to be adapted in such a way that an optimal interference contrast results when the fed back measurement signal and an interference signal are superposed. Therefore this value also depends on the reflectivity of the object surface 60.

The coating sequence of the interference filters 21 and 22, respectively, must be adapted according to the incidence direction of the light 12 in the reference beamsplitter 20. In other words, if the layer construction comprising interference filter 21, spacer layer 23 and interference filter 22 is carried out directly on an end face of an optical element (e.g., the light output surface 11 of the light-conducting fiber 10) transmitting the light 12, the coating of the first alternating layer system and second alternating layer system must be carried out in the reverse order starting with the alternating layer system for the longest-wavelength spectral range.

Taking into account the refractive index of the material used for producing the spacer layer 23, the thickness thereof is adjusted to the exactly calculated optical path difference between the measurement light bundles $M_1$ and $M_2$. The spectral dependency of the optical path difference results from all of the optically dispersive elements through which the two measurement light bundles $M_1$ and $M_2$ pass between exiting and reentering the light-conducting fiber 10, e.g., the focusing optics 40, but also the support material 24 and the spacer layer 23 of the reference beamsplitter 20. However, the spacer layer 23 is also traversed by reference light bundle $R_1$ so that it is not relevant for the adjustment of the dispersion difference between reference light bundles $R_1$ and $R_2$.

Figure 4:
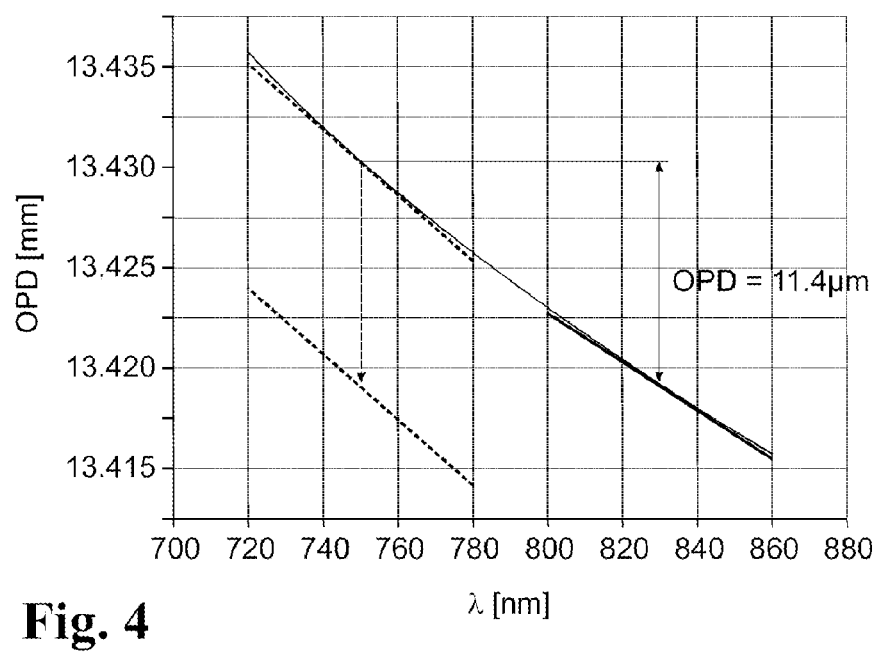
FIG. 4 shows the effect of the reference beamsplitter with two spaced apart partially reflecting filters.

The adaptation of the thickness of the spacer layer 23 will be described in the following referring to the graph in FIG. 4 using the spectral ranges that were described by way of example above. An optical path difference of about 12 μm results in each instance between the measurement light bundle $M_1$ with the shorter-wavelength spectral range (with center wavelength $\lambda_1$ of 750 nm) and the measurement light bundle $M_2$ with the longer-wavelength spectral range (with center wavelength $\lambda_2$ of 830 nm) when passing through the dispersive element (focusing optics 40) on the way from reference beamsplitter 20 to object surface 60 and on the way back from object surface 60 to reference beamsplitter 20. Assuming a refractive index n=1.5 of the spacer layer 23 by way of example, a thickness of 8 μm is required to compensate for the path difference of measurement light bundles $M_1$ and $M_2$, respectively, relative to the reference light bundles $R_1$ and $R_2$, respectively, partially reflected at the reference beamsplitter 20. This thickness is given by the quotient of simple optical path length difference and refractive index n of the spacer layer 23. In the graph, the reflection range of the interference filter 22 for the long-wavelength spectral range is represented by a continuous bold line segment and that of the interference filter 21 for the short-wavelength spectral range, which interference filter 21 is displaced by the thickness of the spacer layer 23, is represented by a dashed bold line segment. A white light interferometry can be generated for two different spectral ranges simultaneously through this compensation of the optical path difference. Any optically transparent medium that can be applied in the required layer thickness and that has a refractive index n comparable to the dispersive elements present in the light path 30 of the measurement light bundles $M_1$ and $M_2$ can be used as material for the spacer layer 23.

After singulating, the individual reference beamsplitters 20 have a size adapted to the proportions of the light-conducting fiber 10 or other beam-guiding optical elements.

Figure 5:
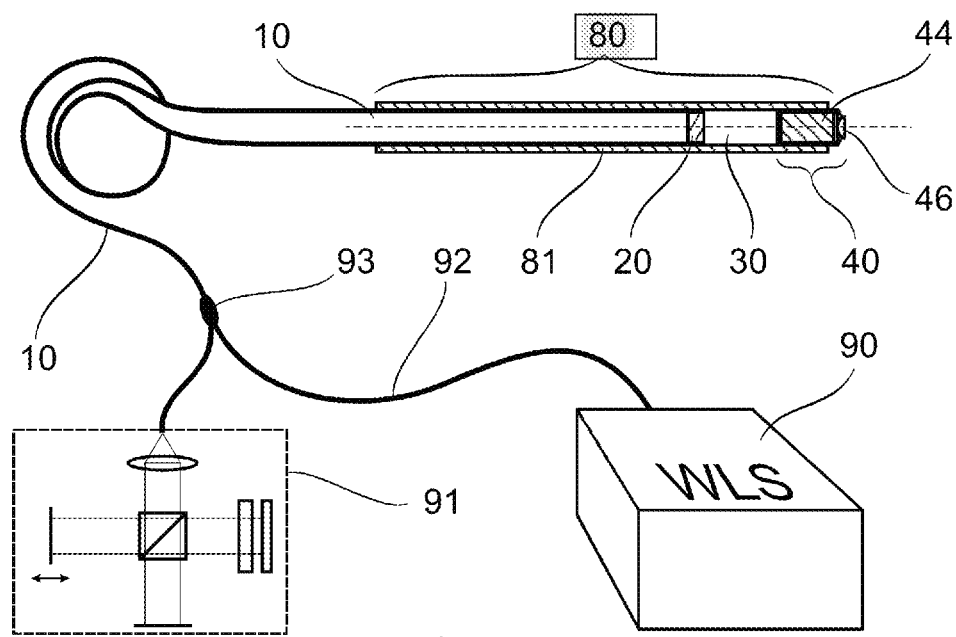
FIG. 5 is an arrangement for the use of the microprobe for white light interferometry.

A measurement arrangement which is preferably used for the interference measurement with the microprobe 80 according to the invention is shown in FIG. 5.

The arrangement for white light interferometry according to FIG. 5 has an interferometer 91 and microprobe 80. The microprobe 80 is connected to the interferometer 91 by the light-conducting fiber 10. A white light source (WLS) 90 with a light coupler 92 is connected to the light-conducting fiber 10 by a fiber duplexer 93. The microprobe 80 comprises a housing 81 which receives, in order of optical effect, the end of the light-conducting fiber 10, the reference beamsplitter 20, the light path 30 and the focusing optics 40 (with the GRIN lens 44 and plano-convex lens 46).

A light 12 which is generated in the white light spectrum by the white light source 90 or light 12 with at least two different spectral ranges with center wavelengths $\lambda_1, \lambda_2, \ldots$ is radiated into the light-conducting fiber 10 by the light coupler 92 via the fiber duplexer 93. The fiber duplexer 93 can be produced by a splice connection. In the microprobe 80, the light 12 exits the light-conducting fiber 10 and passes through the reference beamsplitter 20. By means of the reference beamsplitter 20, a small portion of light 12 is reflected back into the light-conducting fiber 10 up to the interferometer 91. These partially reflected beam portions form the reference light bundles $R_1, R_2, \ldots$. The greater portion which is not reflected forms the measurement light bundles $M_1, M_2, \ldots$.

The measurement light bundles $M_1, M_2, \ldots$ diverge in the light path 30 with the numerical aperture of the light-conducting fiber 10 to the maximum usable numerical aperture of the focusing optics 40. The length of the light path 30 is configured in a corresponding manner. Subsequently, the measurement light bundles $M_1, M_2, \ldots$ are focused by the focusing optics 40 on the object surface 60. A portion of the measurement light bundles $M_1, M_2, \ldots$ is reflected on the object surface 60 back through the focusing optics 40, light path 30 and reference beamsplitter 20 and is coupled into the light-conducting fiber 10 up to the interferometer 91.

Owing to the different spectral ranges, an optical path difference occurs between measurement light bundles $M_1, M_2, \ldots$, in contrast to reference light bundles $R_1, R_2, \ldots$, when these measurement light bundles $M_1, M_2, \ldots$ pass through focusing optics 40 which have not been chromatically corrected. The reference beamsplitter 20 is provided in order to compensate for this optical path difference and to carry out at the same time a measurement with light 12 comprising at least two different spectral ranges with center wavelengths $\lambda_1, \lambda_2, \ldots$. In so doing, the reference beamsplitter 20 ensures that the optical path difference to which the spectrally different measurement light bundles $M_1, M_2, \ldots$ are subjected in the focusing optics 40 (or other dispersive optical components) is adjusted to the same magnitude for the reference light bundles $R_1, R_2, \ldots$ so that the path differences to be measured in the interferometer 91 are not corrupted as a result of the optical path difference.

The reference beamsplitter 20 can be arranged directly on the light output surface 11 of the light-conducting fiber 10 or on the separate support material 24 and subsequently connected to the light output surface 11 of the light-conducting fiber 10 on the opposite side from the support material 24. This is preferably carried out by gluing (i.e., optical cementing). But it is also possible to arrange the reference beamsplitter 20 separately between the light output surface 11 of the light-conducting fiber 10 and the focusing optics 40.

Particularly in white light interferometry, corrective optics must be provided in the measurement light bundles $M_1, M_2, \ldots$ for suppressing the disruptive longitudinal chromatic aberration occurring in the focusing optics 40. The GRIN lens 44, if any, can be diffractive optics 45 arranged directly at the focusing optics 40.

An achromat 47 comprising a refractive collective lens and a dispersive lens or an apochromat comprising two refractive collective lenses or an dispersive lens made from glasses of different dispersion can also be used as focusing optics 40 for compensation.

For accurate measurement of the object surface 60 with sharply angled or reflective surface portions, the microprobe 80 should have the highest possible numerical aperture on the object side. For this purpose, the focusing optics 40 can be supplemented by an additional object-side plano-convex lens 46 whose plane side forms the object-side termination of the microprobe 80. The object-side numerical aperture of the focusing optics 40 (and therefore of the microprobe 80) can be increased to values of 0.55<NA<0.85 in this way.

In the interferometer 91, the reflected measurement light bundles $M_1, M_2, \ldots$ and the reference light bundles $R_1, R_2, \ldots$ are made to interfere simultaneously by the arms of the interferometer 91. By superposing the two interference signals in the same manner as described in DE 10 2005 061 464 A1, a high-resolution measurement signal is generated by which the smallest absolute distance changes between the microprobe 80 and the object surface 60 can be detected.

REFERENCE NUMERALS 10 light-conducting fiber
11 light output surface
12 light (broadband)
20 reference beamsplitter
21 interference filter (for the shorter-wavelength spectral range)
22 interference filter (for the longer-wavelength spectral range)
23 spacer layer
24 support material
30 light path
40 focusing optics
41 imaginary focusing optics (with effective refractive index for the longer-wavelength spectral range)
42 imaginary focusing optics (with effective refractive index for the shorter-wavelength spectral range)
44 GRIN lens
45 diffractive optics
46 plano-convex lens
47 achromat
50 measurement distance
60 object surface
61 measurement spot
$\lambda_1$ center wavelength of a shorter-wavelength spectral range
$\lambda_2$ center wavelength of a longer-wavelength spectral range
$R_1$ reference light bundle of the shorter-wavelength spectral range
$R_2$ reference light bundle of the longer-wavelength spectral range
$M_1$ measurement light bundle of the shorter-wavelength spectral range
$M_2$ measurement light bundle of the longer-wavelength spectral range
80 microprobe
81 housing
90 white light source
91 interferometer
92 light coupler
93 fiber duplexer

What is claimed is:

1. An optical microprobe for focusing a light bundle on an object surface for interferometric measurements comprising:
a light-conducting fiber transmitting light and having a light output surface providing a light bundle comprising white light of at least two different spectral ranges;

focusing optics for focusing the light bundle on the object surface;

a light path optically coupling the light output surface of the light-conducting fiber with the focusing optics and allowing the light bundle to propagate divergently along the light path through an aperture of the focusing optics;

a reference beamsplitter disposed along the light path, the reference beamsplitter having partially reflecting filters in at least two different spectral ranges for generating at least two transmitted measurement light bundles ($M_1$, $M_2$) and associated reflected reference light bundles ($R_1$, $R_2$) of nonoverlapping spectral ranges, the at least two measurement light bundles ($M_1$, $M_2$) being released from the partially reflecting filters, focused by the focusing optics, directed to the object surface, and reflected from the object surface back through the focusing optics into the light-conducting fiber, and the at least two reference light bundles ($R_1$, $R_2$) being generated by partial reflection at the the partially reflecting filters and reflected back into the light-conducting fiber; wherein an axial distance between the at least two partially reflecting filters is adjusted in such a way that a spectrally induced optical path difference to which the respective measurement light bundles ($M_1$, $M_2$) are subjected when passing through dispersive elements in the light path to the object surface and back is set in the same magnitude between the respective reference light bundles ($R_1$, $R_2$), so that the dispersion-induced path difference is compensated when the measurement light bundles ($M_1$, $M_2$) and associated reference light bundles ($R_1$, $R_2$) enter the light-conducting fiber for successive interferometric superposition; and the focusing optics having a chromatic aberration sufficiently small, so that foci of the spectrally different ranges of the at least two measurement light bundles at least partially overlap in an adjustable measurement range for the object surface.

2. The optical microprobe according to claim 1, wherein the reference beamsplitter has a layer construction comprising:

at least two partially reflecting filters adapted to the at least two different spectral ranges of the spectrally separated measurement light bundles and reference light bundles (M1, M2, R1, R2) ; and a transparent spacer layer axially separating in each instance two of the at least two partially reflecting filters, the transparent spacer layer having a layer thickness such that a dispersion-compensating effect of the measurement light bundles (M1, M2) is affected by the layer thickness and by a refractive index of the transparent spacer layer.

3. The optical microprobe according to claim 2, wherein the at least two partially reflecting filters are formed as interference filters with such a cut-off filter characteristic that the measurement light bundles and the reference light bundles (M1, M2, R1, R2) have no spectral overlap.

4. The optical microprobe according to claim 2, wherein the at least two partially reflecting filters are formed as special color filters for generating the spectrally separated measurement light bundles and the reference light bundles (M1, M2, R1, R2), and wherein a light source generates the light bundle with spectrally separated spectral ranges for generating the measurement light bundles ($M_1$, $M_2$) and the reference light bundles ($R_1$, $R_2$) with no spectral overlap.

5. The optical microprobe according to claim 1, wherein the reference beamsplitter has a plurality of partially reflecting filters comprising filter layers in a filter layer system, wherein the layers of the filter layer system are characterized by such thickness and refractive index that a quasi-continuous dispersion compensation layer system is achieved in which spacer layers separating each two of the at least two partially reflecting filters are omitted.

6. The optical microprobe according to claim 1, wherein the reference beamsplitter is arranged on a surface of a transparent support material, the surface being arranged opposite of the light output surface of the light-conducting fiber.

7. The optical microprobe according to claim 1, wherein the reference beamsplitter is arranged directly on the light output surface of the light-conducting fiber.

8. The optical microprobe according to claim 1, wherein the focusing optics comprise conventional refractive optics and diffractive optics for correcting the chromatic aberration.

9. The optical microprobe according to claim 1, wherein the focusing optics comprise a GRIN lens which is combined with diffractive optics for correcting the chromatic aberration.

10. The optical microprobe according to claim 9, wherein the focusing optics comprise the GRIN lens and additional refractive optics for increasing an object-side numerical aperture and are combined with the diffractive optics for correcting the chromatic aberration.

11. The optical microprobe according to claim 1, wherein the focusing optics comprises diffractive optics for correcting the chromatic aberration arranged as a layer system on an optical surface of the focusing optics.

12. The optical microprobe according to claim 1, wherein the focusing optics are formed as an achromat for correcting the chromatic aberration.

13. A method of focusing a light bundle on an object for interferometric measurements with an optical microprobe of claim 1, the method comprising:

measuring an absolute interferometric path length in a nanometer range for arbitrary surfaces at base distances between the microprobe and a measurement object of a hundred micrometers or more by compensating a dispersion-induced path difference and by correcting a chromatic aberration; and performing nanometer-resolving range measurements of positions of the arbitrary surfaces.

14. The method of claim 13, wherein the arbitrary surfaces are surfaces with roughness.

15. The method of claim 13, wherein the arbitrary surfaces are specular surfaces.

16. The method of claim 13, wherein the arbitrary surfaces are at least locally oblique/inclined surfaces.

* * * * *